July 15, 1969 3,455,742
MLARUR LAKSHMANAROA BHASKARA RAO
HIGH ENERGY DENSITY SOLID ELECTROLYTE CELLS
Filed Feb. 10, 1966 2 Sheets-Sheet 1

POLARIZATION CHARACTERISTIC OF $Li/LiI/I_2$ CELL
AT ROOM TEMPERATURE

*INVENTOR.*
M. L. BHASKARA RAO

BY

ATTORNEY

POLARIZATION CHARACTERISTIC OF Li/LiI-AgI/Ag CELL 3,455,742
HIGH ENERGY DENSITY SOLID
ELECTROLYTE CELLS
Mlarur Lakshmanaroa Bhaskara Rao, Burlington, Mass.,
assignor to P. R. Mallory & Co. Inc., Indianapolis, Ind.,
a corporation of Delaware
Filed Feb. 10, 1966, Ser. No. 526,415
Int. Cl. H01m 21/00, 11/00, 13/06
U.S. Cl. 136—83                                                9 Claims

ABSTRACT OF THE DISCLOSURE

High energy density solid electrolyte cells have been formed employing alkali/alkali metal halide system, mainly with Li/LiI. For cathode, halides of silver, copper and, more particularly, to solid electrolyte cells of high vanadium, mercury, thallium and the like. Open circuit voltages of 2.2 to 2.45 v. have been observed for Li/LiI/AgI/Ag cells. Addition agents such as $MgI_2$ have been suggested to improve the cell performance.

---

This invention relates to electric current producing cells, and, more particularly, to solid electrolyte cells of high energy density.

Miniaturization in electronics has been rapidly advancing in recent years and has resulted in increased demand for special power sources characterized by volume and weight comparable to those of electronic components employed in the circuitry. Some degree of success in meeting this demand has been achieved by employing solid electrolyte cells. Apart from the advantage of miniaturization, solid electrolyte cells and batteries permit great flexibility in design and possess extremely long shelf-life of the order of five to ten years.

The electrolytes employed in solid state cells are ionic conductors and, when incorporated between suitable anodes and cathodes, deliver voltage and current. The performance of any given cell depends on the specific resistance of the electrolyte, the nature of the conducting species and their transport number, the temperature of the cell, and the initial and final products of the cell reactions.

It is an object of the present invention to improve solid electrolyte cells.

It is another object of the present invention to provide a solid electrolyte cell characterized by high energy density.

It is a further object of the present invention to provide novel and improved high energy solid electrolyte cells and batteries having an extremely long shelf life, a large and continuous output of electrical energy for its size, and which may be readily manufactured and sold on a practical and commercial scale at a low cost.

Other and further objects and advantages of the present invention will become apparent from the following description, taken in conjunction with the accompany drawing, in which—

Broadly stated, in accordance with the principles of the present invention, there is provided a solid electrolyte cell comprising two metal/metal halide voltaic half-cells in combination. High energy density for the system is realized by employing a light weight, high voltage anode, an alkali metal and its halide in combination, such as the lithium/lithium iodide half cell. The cathodes selected for the cells of the present invention are metal-metal halide voltaic half cells, particularly silver/silver halide, such as silver/silver iodide. Other metal/metal halide cathodes suitable for the purpose of the present invention are silver/silver mercuric halide, such as silver/silver mercuric iodide ($Ag/Ag_2HgI_4$), lead/lead halide and copper/copper halide. The present system employs a combination of two different salts as electrolyte, such as lithium iodide in combination with silver halide, silver mercuric halide, lead halide or copper halide.

The major problem with solid electrolyte cells is the selection of suitable electrolytes. The ion or ions of the electrolytes should involve the ionic transport of the major part of the current. These and other requirements are satisfied by the following system, constituting the preferred form of the present invention:

Li/LiI/AgI/Ag

It will be noted that the preferred cell is a high energy density solid electrolyte system comprising two metal-metal halide voltaic half-cells in combination. Practical cells of this kind have been assembled by employing pressed pellets (1 sq. cm. x 1 mm.) of each of the electrolyte salts, appropriately sandwiched with lithium and silver metal. Current potential measurements of the cell have been carried out after providing suitable electrical connections and wrapping the cells in Teflon tape. A cell of the described character is illustrated in FIG. 1.

Figure 1:
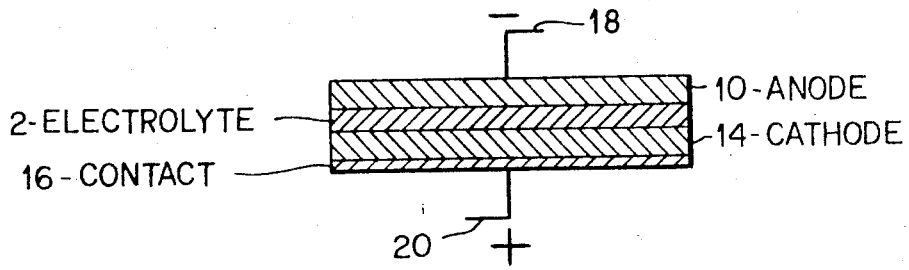
FIG. 1 is a vertical sectional view of a solid electrolyte cell embodying the principles of the present invention.

Referring now more particularly to FIG. 1 of the drawing, reference numeral 10 denotes the anode, which in the preferred embodiment of the invention may be lithium metal. Anode 10 is in contact with one face of a solid electrolyte layer 12, such as one of lithium idoide, the other face of which is in contact with cathode 14. The cathode may be composed of silver iodide or of any one of the other cathode materials described in the specification. A contact layer 16 of high electrical conductivity, such as one of silver foil, is applied to cathode 14. Lead wires 18 and 20 are connected to anode 10 and to cathode contact 16, respectively, and constitute the electrical terminals of the cell. For protection, the cell may be wrapped in Teflon tape (not shown), leaving the lead wires outside of the tape wrap. Of course, protective coverings or casings of other types may be used with equal or similar results, as those skilled in the art will readily understand.

Figure 2:
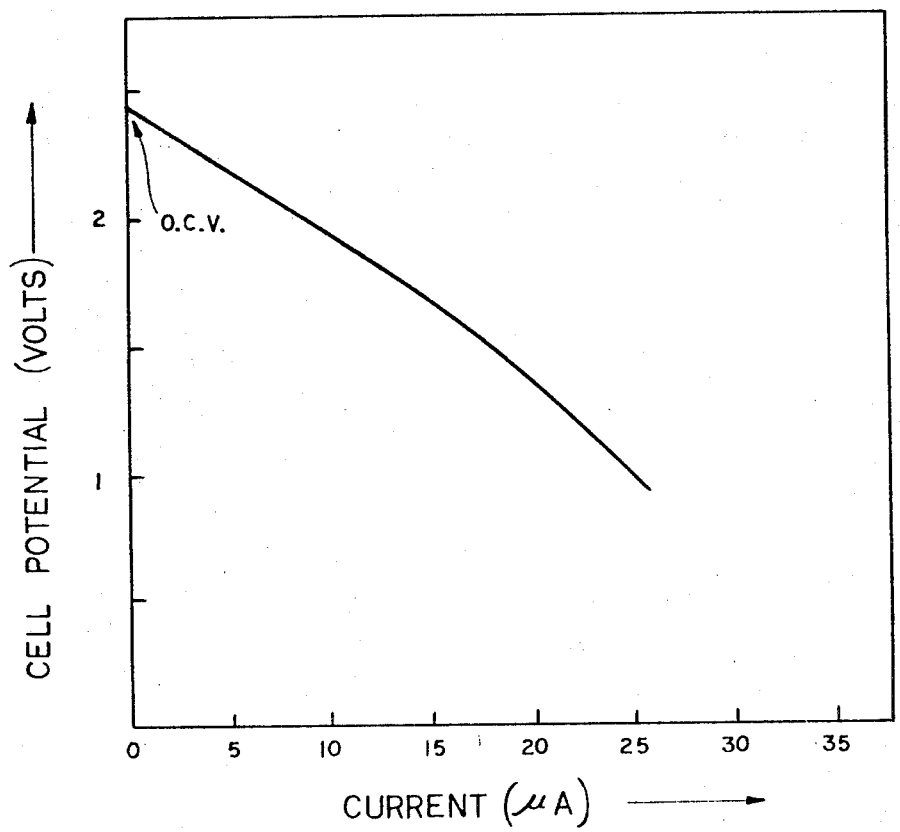
FIG. 2 is a curve illustrating the polarization characteristics of the cell shown in FIG. 1

FIG. 2 gives the open circuit and the operating characteristics of typical cells assembled as described in the foregoing. The open circuit voltage of the cell is 2.2 to 2.45 volts. The cell potential varies linearly with the current drawn, indicating that internal resistance dominates the cell performance. Cells of similar performance characteristics may be made by replacing the silver iodide cathode with other silver/silver halide cathodes. Furthermore, cathodes of silver/silver mercuric halides, lead/lead halides and copper/copper halide may be combined with lithium/lithium iodide anodes to provide satisfactory high energy density cells.

The performance of all of the above-mentioned cells may be improved by reducing the thickness of the electrolyte layer, by adding impurity salts to enhance ionic migration of charge carriers, by operating the cells at elevated temperatures or by any combination of these expedients. A plurality of the cells of the invention may be connected in series or parallel, or both, to obtain batteries of higher voltage or capacity. Also, the cells of the invention may be used as secondary or rechargeable cells.

Figure 3:
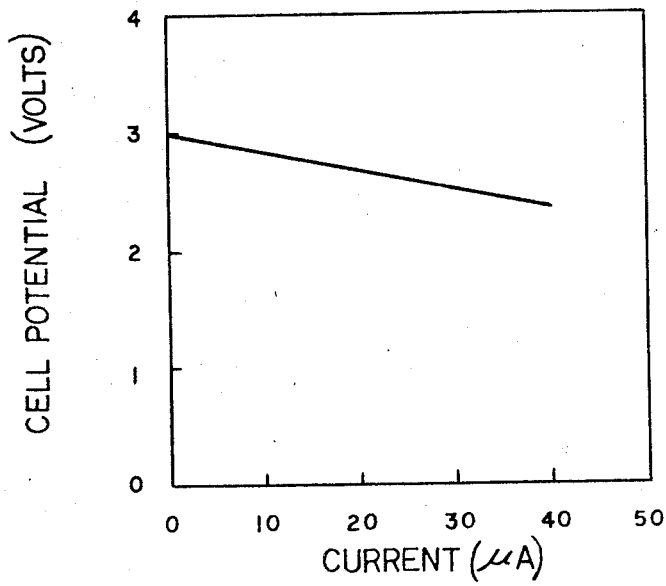
FIG. 3 is a similar curve illustrating the polarization characteristics of a modified cell embodying the principles of the present invention.

Of the various alkali metal halides, lithium iodide is the one which possesses a specific resistance of the order of $5 \times 10^6$ ohms/cm. at room temperature and is thus eminently suitable for cell applications. In the preferred form of the invention described in the foregoing, a lithium/lithium iodide half cell is combined with a silver/silver iodide half cell. However, the invention also contemplates a cell in which the lithium/lithium iodide anode is combined with an iodine cathode (Li/LiI/I). A suitable iodine cathode may be prepared by absorbing iodine on charcoal (0.75 gram of iodine per gram of charcoal). The thickness of the electrolyte layer was 1 mm. FIGURE 3 illustrates the polarization behavior of this cell, indicating that the internal resistance of the cell corresponds to the specific resistance of the electrolyte. For this reason, the cell performance may be improved by reducing the thickness of the electrolyte layer or by adding suitable salts. For example, the addition of magnesium iodide in 0.06 to 0.08 mole percent improves the conductivity of the electrolyte. A cell potential of 3 v. is realized in this case without stacking.

While in combination with a lithium/lithium iodide anode both a silver/silver iodide cathode as well as the iodine cathode can provide a practical and operative solid elecrolyte cell, there are certain essential differences between the characteristics and the mode of operation of the two types of cells:

(a) When using a silver/silver iodide cathode between current collectors, there is a combination of two different salts LiI/AgI as compared to single electrolyte of a cell employing iodine cathode.

(b) The cell employing a silver/silver iodide cathode operates with high energy density whereas the cell employing an iodine cathode operates with low energy density.

(c) The cell employing a silver/silver iodide cathode operates on a voltaic cell principle of dissolution and deposition of metals at the metal-metal halide interface. In contrast to this, the mechanism of the cell employing an iodine cathode involves redox potentials.

Generally speaking, the cells employing a silver/silver iodide cathode are superior to those having an iodine cathode. The former dispense with the use of iodine which requires a binder and a conductor for the half cell operation. This is unnecessary when the cathode is silver/silver halide, for example, silver/silver iodide, and where the depositing metal itself, e.g. Ag from AgI, serves as conductor, the cathodes requiring no additional conductor or binder. In contrast to iodine, the metal-metal halide cathodes are non-corrosive and hence qualify the cells for applications wherein the presence of corrosive materials, such as iodine, cannot be tolerated. For the above-mentioned reasons the use of silver/silver halide cathodes greatly simplifies the manufacture and assembly of both single cells, as well as of stacked cells.

Although the present invention has been disclosed in connection with preferred embodiments thereof, variations and modifications may be resorted to by those skilled in the art without departing from the present invention. Thus, redox cathodes other than iodine may be used. These are suitable carbon mixes of oxides and halides of polyvalent metals, such as $AgO$, $MnO_2$, $PbO_2$, $V_2O_5$, $CeO_2$, or $FeX_3$, $HgX_2$, $TlX_3$, $CuX_2$, and the like, wherein X denotes the halide atom. These cathodes, in combination with an alkali metal and its halide, specifically lithium/lithium iodide, as the anode, provide solid electrolyte cells of different voltages. All of these variations and modifications are considered to be within the true spirit and scope of the invention, as disclosed in the foregoing description and defined by the appended claims.

What is claimed is:

1. A solid electrolyte cell comprising an anode consituted by an alkali metal and its halide, a metal/metal halide cathode, and a solid electrolyte.

2. A solid electrolyte cell comprising an anode of lithium/lithium halide, a metal/metal halide cathode, and a solid electrolyte consisting of a combination of two different halogen salts.

3. A solid electrolyte cell as claimed in claim 2, wherein the anode is lithium/lithium iodide.

4. A solid electrolyte cell as claimed in clatim 2, wherein the cathode is a metal/metal halide selected from the group consisting of silver/silver halide, silver/silver mercuric halide, lead/lead halide and copper/copper halide.

5. A solid electrolyte cell as claimed in claim 2, wherein the cathode is silver/silver iodide.

6. A solid electrolyte cell as claimed in claim 2, wherein the cathode is iodine and the electrolyte consists of a single halogen salt.

7. A solid electrolyte cell as claimed in claim 2, wherein the cathode is composed of a pressed mixture of iodine, carbon, and a binder having the characteristics of graphite.

8. A solid electrolyte cell as claimed in claim 2, wherein the cathode is selected from the group consisting of the oxides and halides of polyvalent metals.

9. A solid electrolyte cell as claimed in claim 2, wherein the cathode material is selected from the group consisting of $AgO$, $MnO_2$ $PbO_2$, $V_2O_5$, $CeO_2$ $FeX_3$, $HgX_2$, $TlX_3$, $CuX_2$ in which X denotes a halide atom.

References Cited
UNITED STATES PATENTS

| | | | |
|---|---|---|---|
| 2,696,513 | 12/1954 | Lehovec | 136—153 |
| 2,778,754 | 1/1957 | Shorr | 136—153 |
| 2,793,244 | 5/1957 | Van Der Grinten | 136—153 |
| 3,043,896 | 7/1962 | Herbert et al. | 136—154 |
| 3,078,327 | 2/1963 | Lieb | 136—83 |
| 3,079,454 | 2/1963 | McGinnis | 136—153 |
| 3,134,698 | 5/1964 | Neipert et al. | 136—136 |
| 3,160,531 | 12/1964 | Spindler | 136—120 |
| 3,294,585 | 12/1966 | Senderoff | 136—86 |

OTHER REFERENCES

Evaluation of New Cathode-Anode Couples For Secondary Batteries, by E. F. Uhler and G. S. Lozier. Technical Documentary Report No. ASD-TDR-62-4.

WINSTON A. DOUGLAS, Primary Examiner

A. SKAPARS, Assistant Examiner

U.S. Cl. X.R.

136—90. 100. 153